United States Patent [19]

Neuwirth et al.

[11] Patent Number: 5,027,100

[45] Date of Patent: Jun. 25, 1991

[54] GAS TUBE FAIL SAFE DEVICE FOR TELEPHONE PROTECTOR MODULES

[75] Inventors: Helmuth Neuwirth, Garden City; Carl H. Meyerhoefer, Dix Hills; William V. Carney, Oyster Bay, all of N.Y.

[73] Assignee: Porta Systems Corp., Syosset, N.Y.

[21] Appl. No.: 478,424

[22] Filed: Feb. 12, 1990

[51] Int. Cl.$^5$ ........................ H01H 39/00; H02H 7/24

[52] U.S. Cl. ........................................ 337/32; 361/124; 361/129

[58] Field of Search ........................ 337/32, 15, 28, 24; 361/124, 129, 119

[56] References Cited

U.S. PATENT DOCUMENTS

| | | | |
|---|---|---|---|
| 4,573,100 | 2/1986 | Fasano | 361/119 |
| 4,910,489 | 3/1990 | Neuwirth | 337/32 |
| 4,912,592 | 3/1990 | Flindall et al. | 337/32 |

*Primary Examiner*—H. Broome
*Attorney, Agent, or Firm*—Charles E. Temko

[57] ABSTRACT

A gas tube fail safe device for use in individual subscriber circuit telephone mmodules and related equipment, in which a fusible element is adapted to by-pass the conductive function of the gas tube in the event of gas tube failure. In one embodiment the construction provides for the fusing of the fusible element upon the occurrence of a sustained current overload. In another embodiment, this operation is supplemented by provision of secondary air gap means operative upon the occurrence of momentary excess voltage surges in the presence of a defective gas tube.

1 Claim, 2 Drawing Sheets

GAS TUBE FAIL SAFE DEVICE FOR TELEPHONE PROTECTOR MODULES

BACKGROUND OF THE INVENTION

This invention relates generally to the field of telephony, and more particularly to an improved form of secondary or backup protection for individual subscriber pair protector modules normally installed upon a mainframe in a telephone office.

Such protector modules traditionally employ a pair of carbon electrodes which arc upon the occurrence of momentary current overload to ground the individual circuit. Later developments include heat-sensitive devices employing a fusible solder member which, upon fusing, allows a resilient member to permanently short the module to ground.

A still later development, now in wide spread use is the so-called three element gas tube in which momentary overloads cause the tubes to become conductive to short the overload to ground, and in which, upon the occurrence of a sustained overload, the tube develops sufficient heat to activate a separate heat-sensitive device to cause permanent shorting to ground.

With the development of requirements for protective modules of ever smaller dimensions consistent with connector blocks having ever higher circuit densities, the use of conventional heat sensitive devices including heat coils becomes more difficult because of space limitations, and it has become necessary to provide a heat-sensitive element of sufficiently simple construction to supplement the action of the three-element gas tube without requiring significant additional volume within the protector module housing. Further, in some cases, there is a requirement for secondary air gap protection which will provide protection against momentary overloads in the event of a defective gas tube in which the conductivity voltage levels are other than standard, apart from the function of the heat-sensitive element.

SUMMARY OF THE INVENTION

Briefly stated, the invention contemplates the provision of an improved fail-safe heat-sensitive device of the class described in which the usual heat coil and solder pellet have been replaced by a resilient member having a fusible insulative components adapted to engage the end electrodes of a conventional three element gas tube in such manner that such contact is through a length of fusible synthetic resinous material. In a first embodiment, the device comprises a metallic stamping of beryllium copper or similar material which is shaped so as to be resiliently maintained in position once installed. In a second embodiment, the structure of the first embodiment is supplemented by a thin planar perforated insulative member to provide secondary air gap means permitting arcing to ground in the event of a momentary excess voltage surge not developing sufficient heat to melt the fusible components, where the associated gas tube has failed to function at standard levels of conductivity.

BRIEF DESCRIPTION OF THE DRAWINGS

In the drawings, to which reference will be made in the specification, similar reference characters have been employed to designate corresponding parts throughout the several views.

DETAILED DESCRIPTION OF THE ENCLOSED EMBODIMENTS

Figure 2:
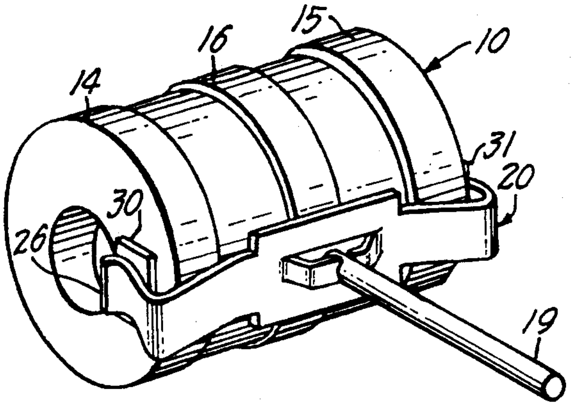
FIG. 2 is an assembled view in perspective of the first embodiment.
Figure 1:
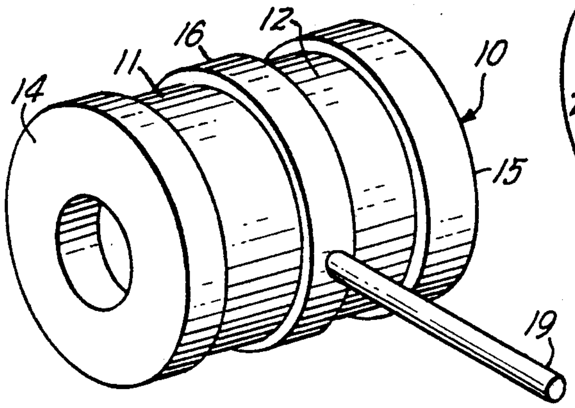
FIG. 1 is a view in perspective of a conventional cylindrical three element gas tube forming a part of the disclosed embodiments.
Figure 8:
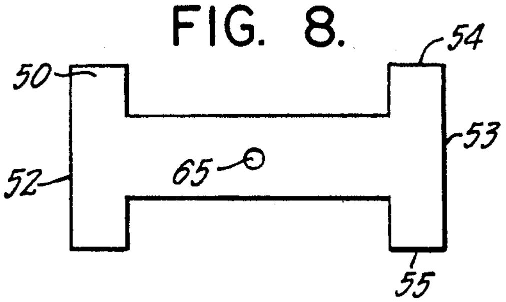
FIG. 8 is a view in elevation showing a shorting plate forming part of the second embodiment.
Figure 3:
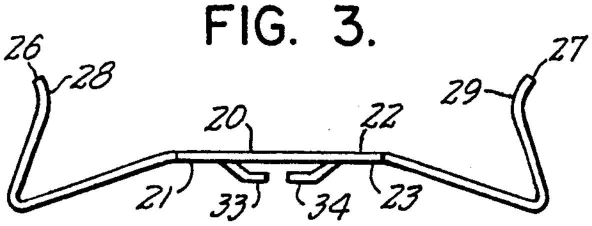
FIG. 3 is a side elevational view of a component part of the first embodiment.
Figure 9:
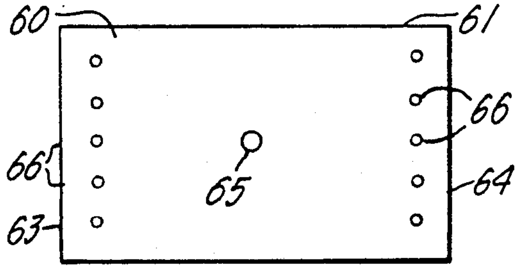
FIG. 9 is a view in elevation of an arc gap insulator member forming a part of the second embodiment.
Figure 4:
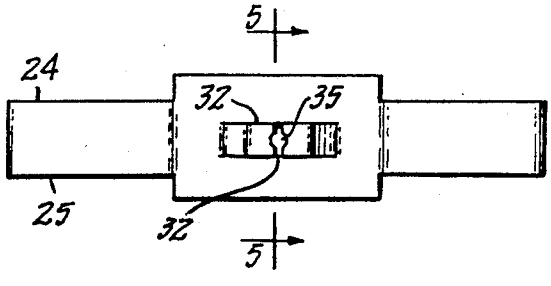
FIG. 4 is a top plan view of the part shown in FIG. 3.

In accordance with the invention, reference character 10 designates a known 3-element gas tube of a type commonly used as the principle protection means in individual subscriber circuit protector modules (not shown). The gas tube normally includes a ceramic main body forming first and second sections 11 and 12 each of which is filled with a gas, such as neon gas, which becomes electrically active above a pre-determined potential. Communicating with the sections 11 and 12 are end electrodes 14 and 15, and a central electrode 16 which, in installed condition within the module, communicates with a ground pin or socket which, in turn, communicates with a source of ground potential on the protector block upon which the module is mounted.

Referring to the first embodiment of the invention, generally indicated by reference character 20, the device comprises a planar body 21 formed of berylium copper, or similar material as a stamping. The body 21 is bounded by an upper surface 22, a lower surface 23, side edges 24 and 25, and end edges 26 and 27. To assist in maintaining the body 21 in electrical contact with the end electrodes 14 and 15 of the gas tube, the edges 26 and 27 are bent upwardly to form generally arcuately shaped terminals 28 and 29 which partially wrap around the contacts. Insulative sleeves 30 and 31 are most conveniently formed by cutting lengths of fusible insulative tubing of Milar or the like.

The body 21 includes a centrally disposed rectangular opening 32 bordered by first and second upwardly bent tabs 33 and 34 which engage the pin 19 which is thus positioned within an open planar area 35 disposed therebeneath. Since the area 35 is of width less than the diameter of the pin 19, when the tabs 33 and 34 are in relatively unstressed condition, a resilient purchase on the pin is obtained after engagement therewith.

In use, the first embodiment functions such that excess sustained current overloads are transformed into heat sufficient to fuse the insulative sleeves 30 and 31 resulting in grounding the end electrodes of the gas tube to the center electrode.

It may be observed that the device 30 requires only limited space within the protector module, and completely eliminates the need for devices having a similar function but requiring much greater volume, such as wire wound heat coils which serve to melt a solder pellet and thus release a separater coil spring which effects a grounding function.

Turning now to the second embodiment of the invention, generally indicated by reference character 50, parts corresponding to those of the first embodiment have been designated by similar reference characters with the additional prefix "1".

The second embodiment differs from the first embodiment in that while the first embodiment provides only protection against relatively sustained current overloads which develops sufficient heat to melt the fusible sleeves 30 and 31, the second embodiment provides protection through secondary air gap means against momentary voltages which do not generate sufficient heat to fuse the sleeves 30 and 31.

This protection is useful, for example, in the case of a defective gas tube which while not totally inoperative has leaked to a degree sufficient to substantially alter the range of voltage over which it is conductive, thus destroying the protection for which it was provided.

Figure 10:
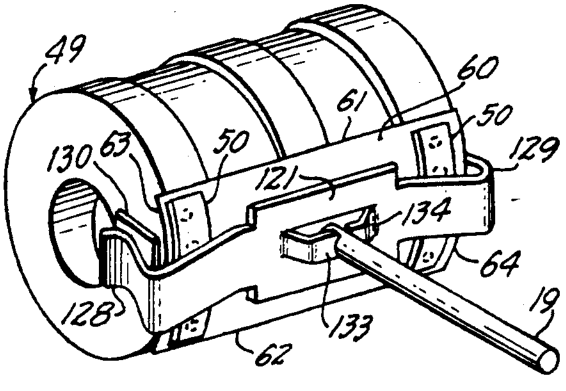
FIG. 10 is an assembly view in perspective of the second embodiment.
Figure 5:
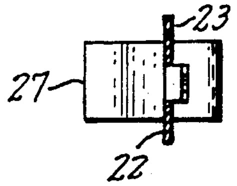
FIG. 5 is a transverse sectional view as seen from the plane 5—5 in FIG. 4.
Figure 6:
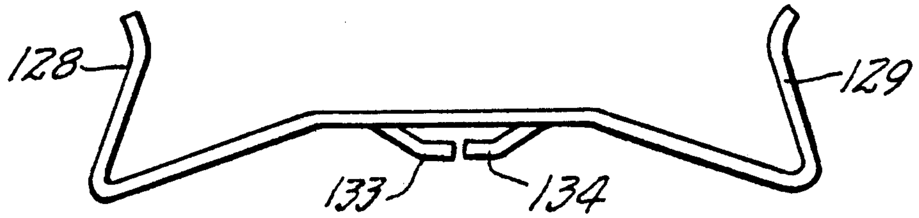
FIG. 6 is a side elevational view of a part corresponding to FIG. 3, but showing a second embodiment of the invention.
Figure 7:
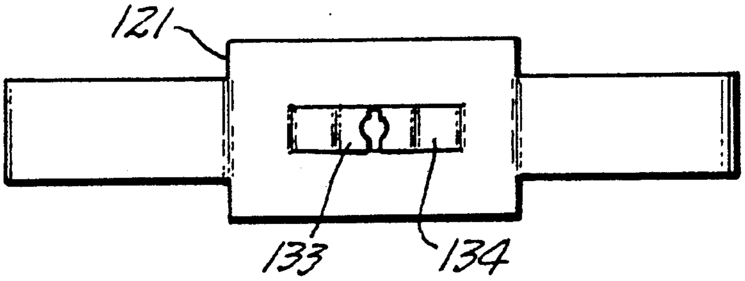
FIG. 7 is a top plan of the part shown in FIG. 6.

Referring to FIG. 10, the second embodiment includes a pair of shorting plates 50 and bounded by side edges 52 and 53 and end edges 54 and 55. The plates 50-51 are positioned beneath the body 121 and overlie an air gap insulative member 60 formed of thin insulative material. The member 60 is bounded by longitudinally edges 61 and 62, and end edges 63 and 64. A centrally disposed opening 65 permits access to the pin 19. Extending along the end edges 63 and 64 are lines of small orifices 66 which provide air gaps through which excess voltage surges may arc to provide a back up function equivalent to that of the gás tubes. Thus, in the second embodiment the occurrence of momentary excess voltage surges as well as sustained excess current surges is fully accommodated, even if the gas tube with which it is associated ceases to function.

We wish it to be understood that we do not consider the invention tó be limited to the precise details of structure shown and set forth in this specification, for obvious modifications will occur to those skilled in the art to which the invention pertains.

We claim:

1. An improved thermally sensitive secondary protection device for use with 3-element gas tubes employed for protecting individual telephone subscriber circuits, said gas tube including first and second end electrodes, and a centrally disposed electrode, said centrally disposed electrode having a laterally extending contact thereon; said protective device comprising: a length of resilient conductive material having a principal axis parallel to that of said tube, and having first and second end portions and a medially disposed portion therebetween; said first and second end portions being resiliently engageable with said first and second end electrodes on said gas tube, and having a fusible insulative covering normally preventing electrical current conduction therebetween; said medially disposed portion including means engaging said contact on said central electrode on said gas tube in electrically conductive relation; whereby, the development of a predetermined degree of heat by said gas tube upon the occurrence of a sustained current overload, will cause fusing of said insulative covering on said first and second end portions, causing shorting of said end electrodes to said center electrodes; said length of resilient conductive material being in the form of a stamping of planar resilient material, the end portions of which form arcuately shaped recesses for engaging the first and second end electrodes of a gas tube to fix the relative position therebetween, said medially disposed portion including a centrally disposed opening bordered by first and second laterally bent tabs, said tabs resiliently engaging said laterally extending contact; means forming secondary air gap protection positioned between said stamping and said end electrodes, whereby said device provides backup protection against momentary voltage surges in the event of failure of said gas tube; said means forming air gap protection including a generally rectangular thin member of planar insulative material, said member having air holes overlying the end electrodes of said gas tube, and a shorting plate overlying said last mentioned insulative member and positioned beneath said stamping.

* * * * *